A. P. & O. H. WAGNER.
CAN LABELING MACHINE.
APPLICATION FILED JAN. 20, 1913.

1,094,349.

Patented Apr. 21, 1914.
10 SHEETS—SHEET 1.

A. P. & O. H. WAGNER.
CAN LABELING MACHINE.
APPLICATION FILED JAN. 20, 1913.

1,094,349.

Patented Apr. 21, 1914.
10 SHEETS—SHEET 4.

A. P. & O. H. WAGNER.
CAN LABELING MACHINE.
APPLICATION FILED JAN. 20, 1913.

1,094,349.

Patented Apr. 21, 1914.
10 SHEETS—SHEET 6.

A. P. & O. H. WAGNER.
CAN LABELING MACHINE.
APPLICATION FILED JAN. 20, 1913.

1,094,349.

Patented Apr. 21, 1914.

UNITED STATES PATENT OFFICE.

ALBERT P. WAGNER AND OSWIN H. WAGNER, OF NORTH DETROIT, MICHIGAN.

CAN-LABELING MACHINE.

1,094,349.   Specification of Letters Patent.   Patented Apr. 21, 1914.

Application filed January 20, 1913. Serial No. 743,083.

*To all whom it may concern:*

Be it known that we, ALBERT P. WAGNER and OSWIN H. WAGNER, citizens of the United States, residing at North Detroit, in the county of Wayne and State of Michigan, have invented certain new and useful Improvements in Can-Labeling Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in can-labeling machines.

The object of the invention is to provide a machine of this type with means by which the label is effectually applied to the can.

Referring to the accompanying drawings, Figure 1, Sheet 1, is an elevation of one side of the machine; Fig. 3, Sheet 3, is a horizontal section approximately on the line $a\ a$ of Fig. 1.

Throughout the specification and drawings, similar reference characters indicate corresponding parts.

*Frame work.* (See Figs. 1, 2, 3, and 4.)—Mounted on a suitable base 1, are right and left side members 2 and 3 which are connected by cross members 4, 5, 6, and 7. Mounted on the cross members 4 and 5 are right and left side members 8 and 9 of the label feeding device hereinafter more fully described.

*Label feeding mechanism.* (See Figs. 1, 2, 3, 4, and 9 to 19.)—Mounted on flanges 10 extending from the side members 8 and 9 is a cross member 11 from which downwardly extends, from its central portion, a tubular member 13 which receives a vertical sliding rod 14. The lower end of the rod 14 is provided with a cross member 15 to which is attached the lower ends of springs 16. The upper ends of the springs 16 are attached to adjusting screws 17 mounted in the cross member 11. Mounted on the upper end of the rod 14 is a horizontal platen 18 which receives a pile of labels 19. The labels are held upon the platen by side plates 20. The springs 16 exert an upward influence on the platen 18 and the labels 19 and maintains the uppermost label in contact with an initial serrated feeding roll 21. The roll 21 is mounted on a shaft 22 journaled in bearings 23ª extending from the side members 8 and 9.

The roller 21 and shaft 22 are intermittently rotated to feed the uppermost label to the subsequent feeding rolls 23 and 24 by the following means: Mounted on the left end of the shaft 22 is a ratchet 25 in operative relation with pawls 26 attached to a gear 27. See particularly Fig. 9. The gear 27 is in mesh with a rack 28 mounted on a horizontal sliding rod 29. The rod 29 is provided with elongated recesses which receive headed pins 30 mounted on the side frames 3 and a bracket 31, thereby forming a bearing for the rod 29. The rod 29 is provided with a roller 32 adapted to be engaged by cams 33 on a gear 34. The cams 33 actuate the rod 29 in the direction of the arrow to initially move the uppermost label, and said rod is returned to its normal position, after it is released by the cams 33, by a spring 34ª attached to the rod and the bracket 31. The amount of movement imparted to the rod 29 and roller 21 by the cams 33 may be adjusted by a screw 35 mounted in a plate 36 and adapted to engage an end of the rod 29. This adjustment is provided to limit the rotation of the roller 21 after the end of the uppermost label has passed the roller, thereby preventing the roller feeding the underlying label at the same time. The gear 34 is mounted on a shaft 37 journaled in the side frames 2 and 3 and is in mesh with a pinion 38 mounted on a shaft 39 journaled in bearings 40 on the side frames 2 and 3. The shaft 39 is the power shaft of the machine, and may be provided with a pulley (not shown) connected with the shaft by any well known form of clutch.

To prevent the friction between the uppermost label and the second label feeding the second label when the uppermost label is fed, the following device is provided. Extending from the side frames 8 and 9 are brackets 40ª which support a cross rod 41. Mounted on the rod 41 is a clamp 42 which receives the shank 43 of a knife 44. The knife 44 is adapted to penetrate the uppermost label and to engage the second label thereby holding the same against a light force such as that which exists between the two upper labels when the upper label is being fed. The resistance offered by the knife, is however, not sufficient to overcome the feeding action of the roll 21. The extent of penetration of the knife 44 may be regulated by adjustable blocks 45ª. The labels, when fed by the roll 21, are received by subsequent feeding rolls 23 and 24. The uppermost roll 23, which is provided with a face of rubber, is the feeding roll, while the lower roll 24 is the idler and is mounted in sliding bearings 49 adjusted by screws 50. The labels are guided to the rolls 23 and 24 by a shield shown in detail in Figs. 18 and 19. The said shield consists of a sheet 45 the ends of which are attached to the side members 8 and 9. Extending from the sheet 45 are guides 46 which engage the end of the pile of labels 19, thereby, in connection with the side plates 20, maintaining the labels on the platen 18. The sheet 45 is provided with brackets 47 which support a curved shield 48 and which is mounted above the labels as will be seen from the drawings.

The feeding roll 23 is actuated by the following means. See particularly Fig. 10. The roll 23 is mounted on a shaft 51 journaled in bearings 52ª attached to the side plates 8 and 9. One end of the shaft 51 is provided with a ratchet 52 engaged by a pawl 53 mounted on a disk 54. The disk 54 is attached to a pinion 55 in mesh with a rack 56 attached to a sliding rod 57. The rod 57 is provided with elongated recesses 58 which receive pins 59 on brackets 60 which extend from the main frame of the machine. The rod 57 is provided with a roller 61 adapted to be engaged by cams 62. The cams 62 are mounted on a rotating spider frame 63 attached to the shaft 37. The cams 62 are adapted to move the rod 57 in the direction of the arrow to move the feeding roll 23, while the rod 57 is returned to a normal position by a spring 64ª which is attached to the rod and one of the brackets 60. The reciprocating motion of the rod 57 is converted into the continuous intermittent motion of the roller 23 by the ratchet 52 and pawl 53. The amount of movement imparted to the rod 57 is adjusted by a sliding block 57ª. The block 57ª is adapted to engage one of the brackets 60 and is adjusted by a screw 57ᵇ having a hand wheel 57ᶜ. The label is fed from the rollers 23 and 24 over a gluing or pasting roller 64. The roller 64 is mounted on a shaft 65 journaled in the side frames 8 and 9, and the lower portion thereof is immersed in any well known form of paste pot 66. During the rotation of the roller 64 the periphery thereof receives a coat of paste or glue from the pot 66 and applies the same to the under surface of the label. The roller 64 is rotated intermittently and at different speeds by the following arrangement. See particularly Figs. 1, 4, and 13.

Splined to the outer end of the shaft 65 is a double clutch member 67 adapted to be placed in engagement with clutch teeth 69 on either a gear 70 or pinion 71 which are also mounted on the shaft 65. The gear 70 is in mesh with a gear 72 while the pinion 71 is in mesh with a gear 73. The gears 72 and 73 are integrally mounted on a pivot 74 and are driven from the power shaft 39 through a train of gears 75 mounted on a bar 76 attached to the side frame 2. When the clutch member 67 is in engagement with the gear 70, the label is initially in engagement with the pasting roll 64 and has not been released by the subsequent feeding rolls 23 and 24. At this time the pasting roll is timed to rotate in unison with the subsequent feeding rolls. After the label is released by the subsequent feeding rolls 23 and 24 it is picked up by the can, when the pasting roll travels faster and the clutch member is in engagement with the pinion 71. The clutch member 67 is actuated by a lever 77 pivoted at 78 and partially controlled by a spring 79. One end of the lever is in engagement with the clutch member 67 while the other end is in operative relation with cam extensions 80 and 81 mounted on a disk 82 attached to the shaft 37. There are two sets of cam extensions 80 and 81 as two labels are fed at each single revolution of the shaft 37. Mounted between the subsequent feeding rolls 23 and 24 and the pasting roll 64 is a guard 84. See particularly Figs. 16 and 17. The guard 84 is supported by arms 85 which extend from a cross member 86 extending between the side members 8 and 9. The guard 84 is so situated as to permit the label to pass above the same and is instrumental in guiding the label to the pasting roll. The label is guided onto the pasting roll 64 by a curved plate 87 which is mounted directly above the roll 64 and is supported by arms 88 extending from the cross member 86.

After the label is pasted, the forward end thereof is caught by a gripper as follows:

*Label gripping mechanism.* (See Figs. 1, 3, 4, 5, 6, and 8.)—The object in providing the label gripper is to hold the label taut so that the can will engage the label squarely.

Figure 1:
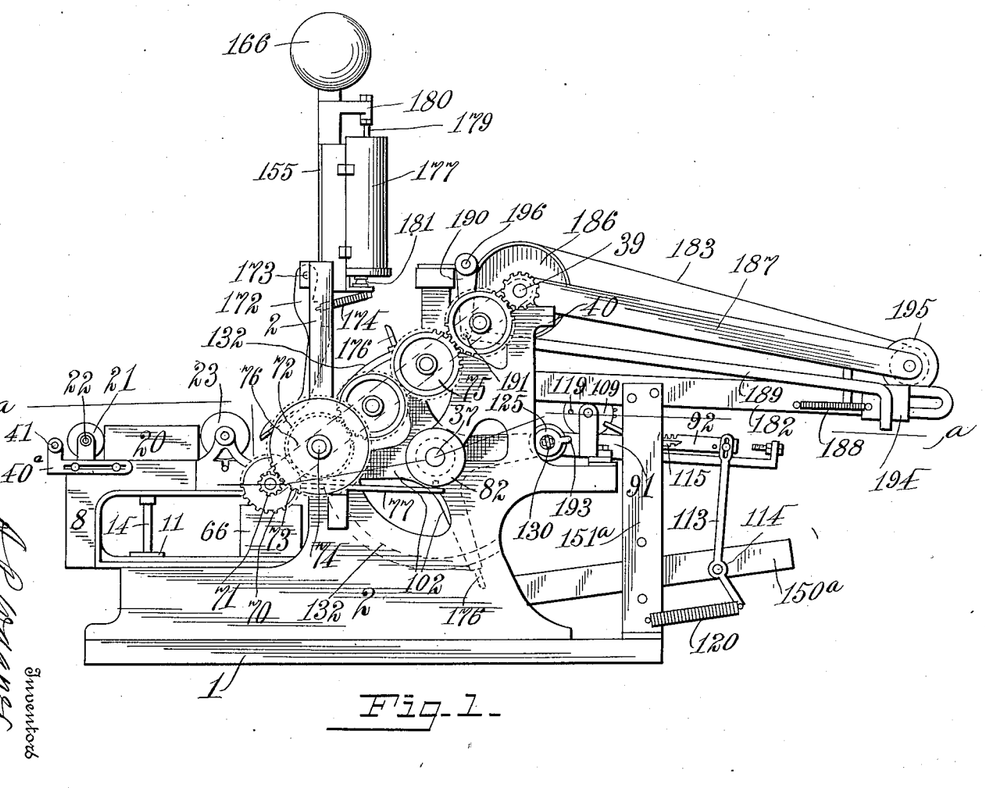
Figure 2:
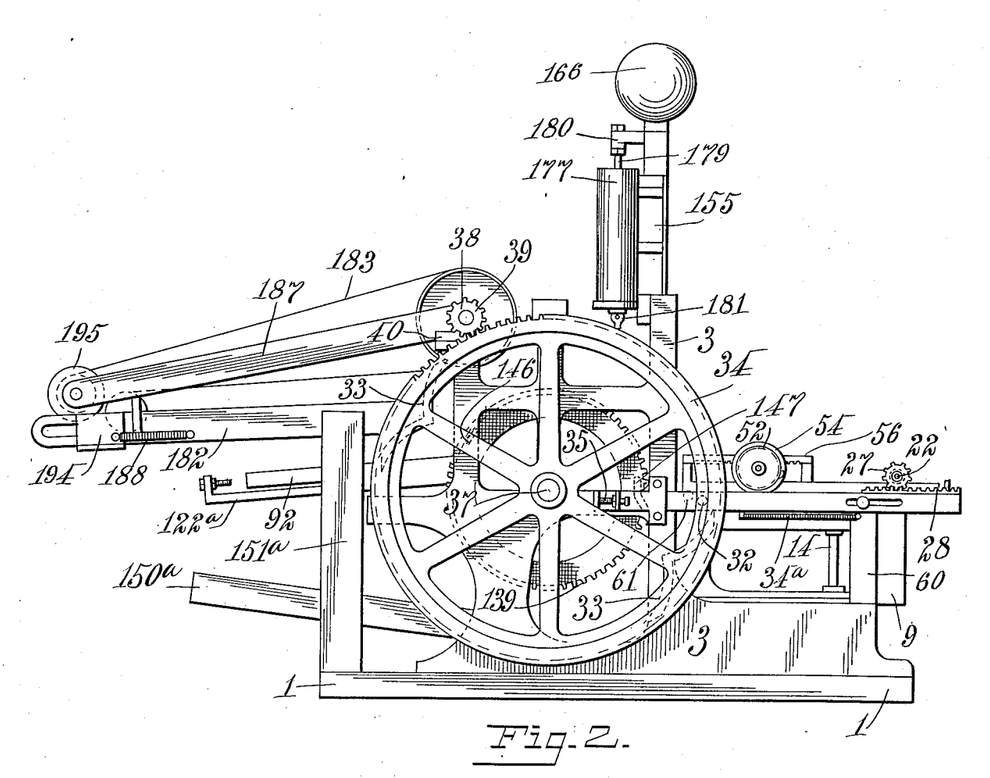
Fig. 2, Sheet 2, is an elevation of the opposite side of the machine.
Figure 4:
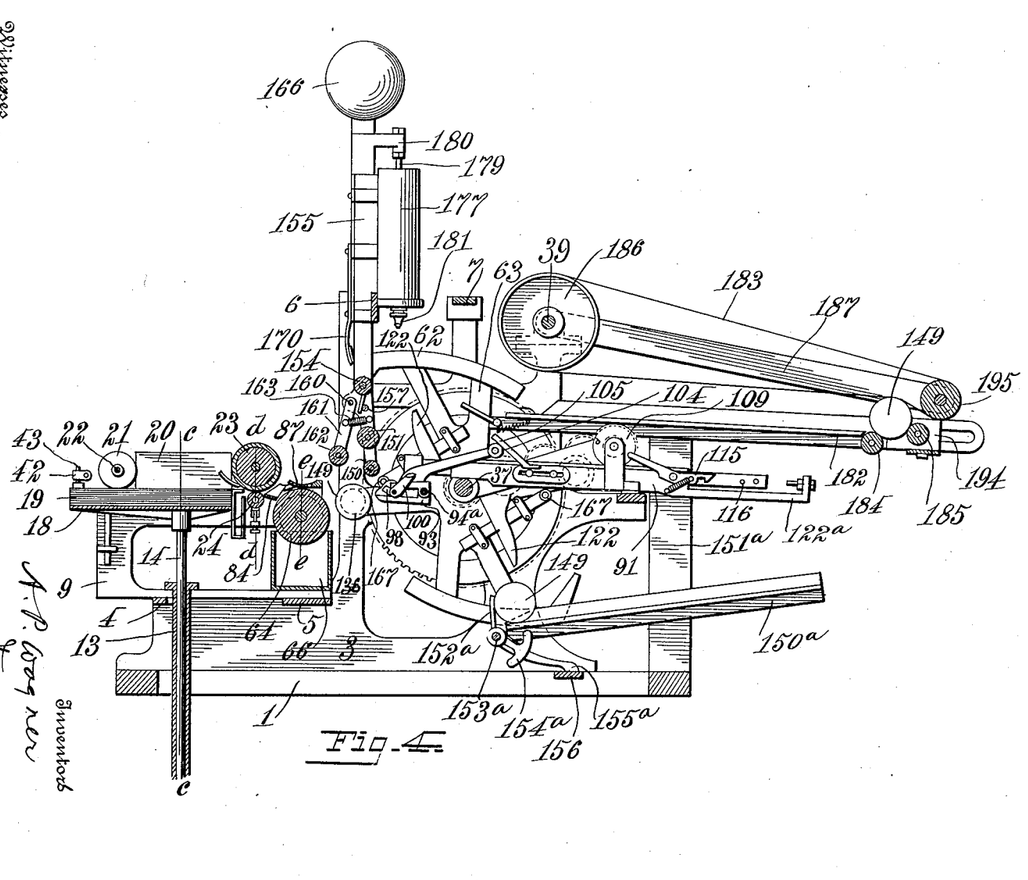
Fig. 4, Sheet 4, is a longitudinal vertical sectional elevation approximately on the line $b\ b$ of Fig. 3.
Figure 5:
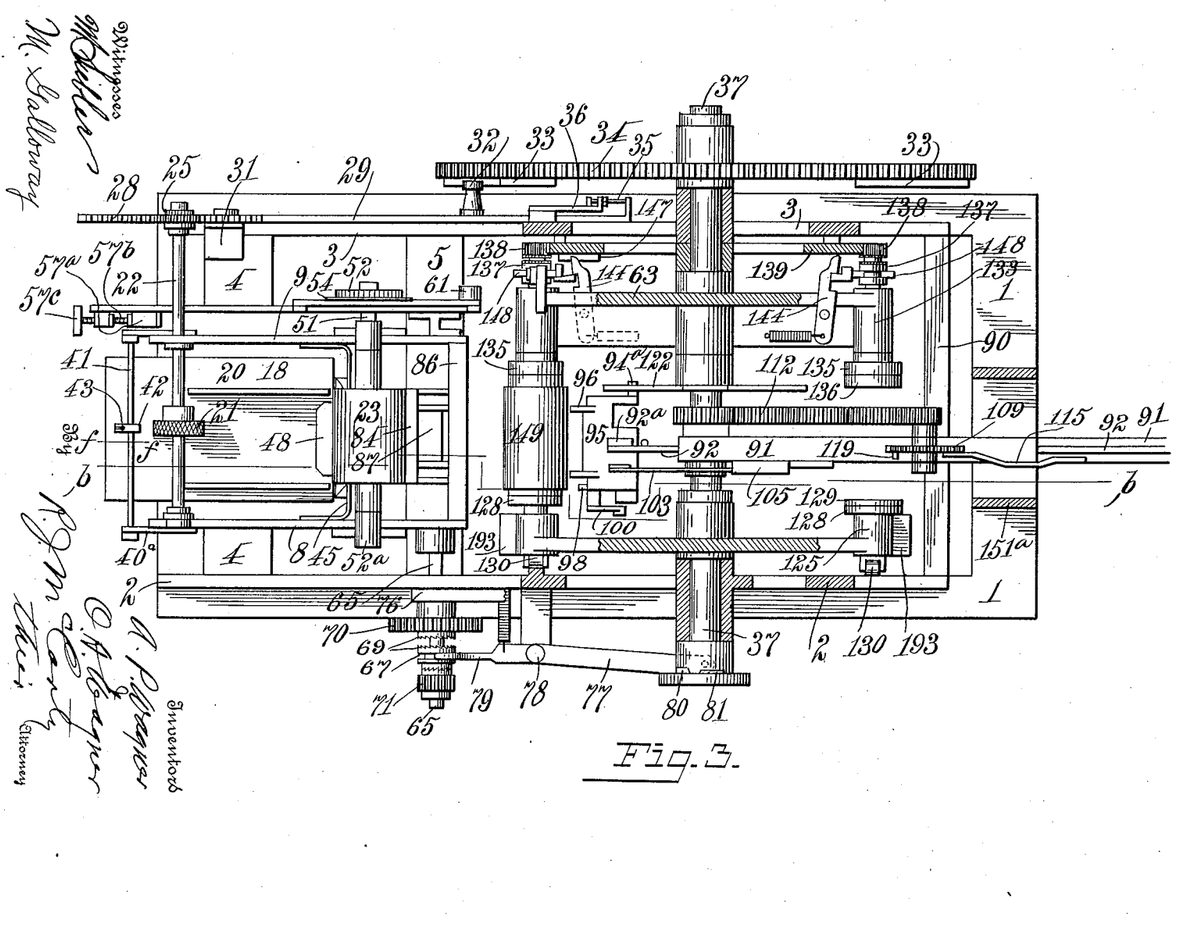
Fig. 5, Sheet 5, is a top plan view of the label gripper, showing its operative relation with the pasting roller.
Figure 6:
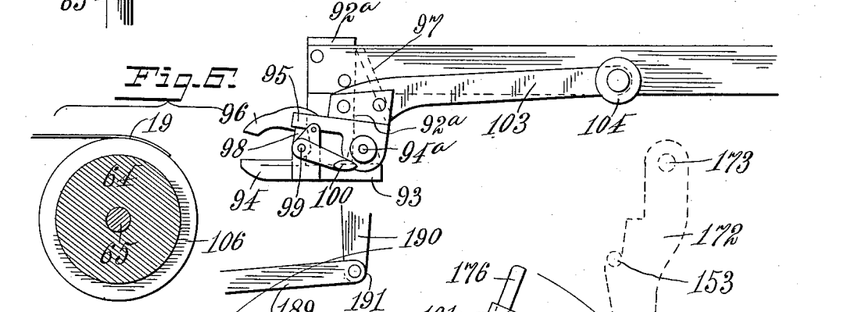
Fig. 6, is a side elevation of the same.
Figure 7:
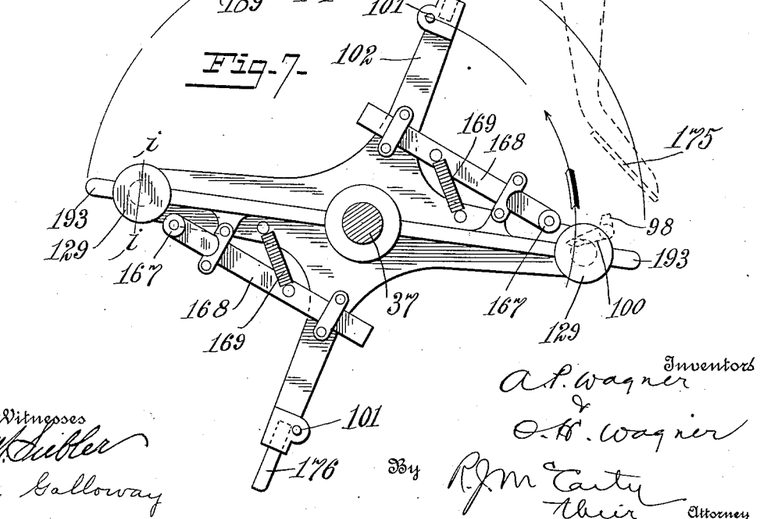
Fig. 7, is an elevation of one of the rotating side members which carries the can during the process of labeling.
Figures 8, 9:
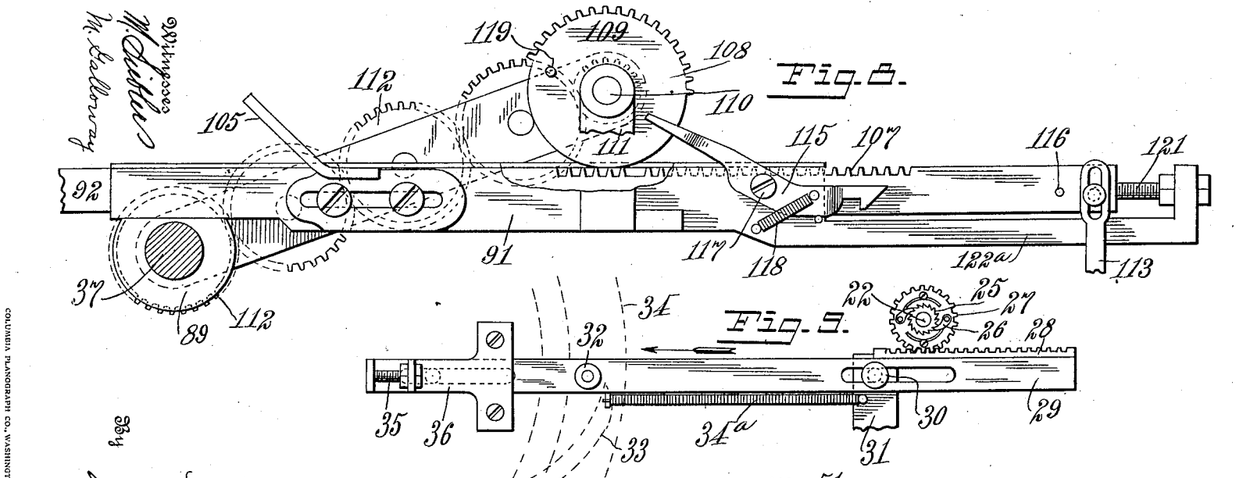
Fig. 8, Sheet 6, is a side elevation of the actuating slide for the label gripper.
Fig. 9, is a side elevation of the actuating mechanism for the initial feeding roll for the label feeding device.
Figure 10:
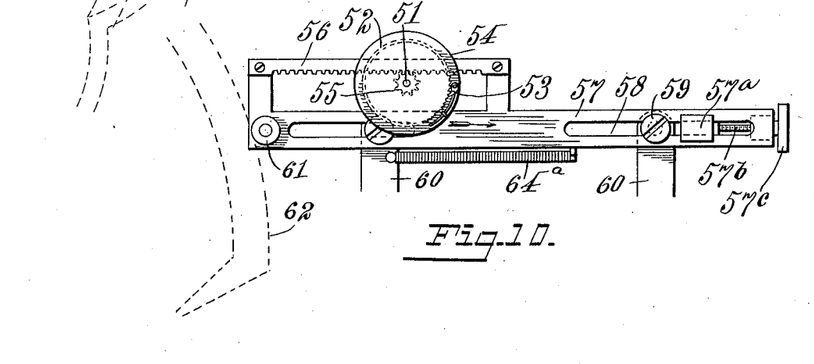
Fig. 10, is a side elevation of the actuating mechanism for the subsequent feeding rolls for the label feeding device.
Figures 11, 12:
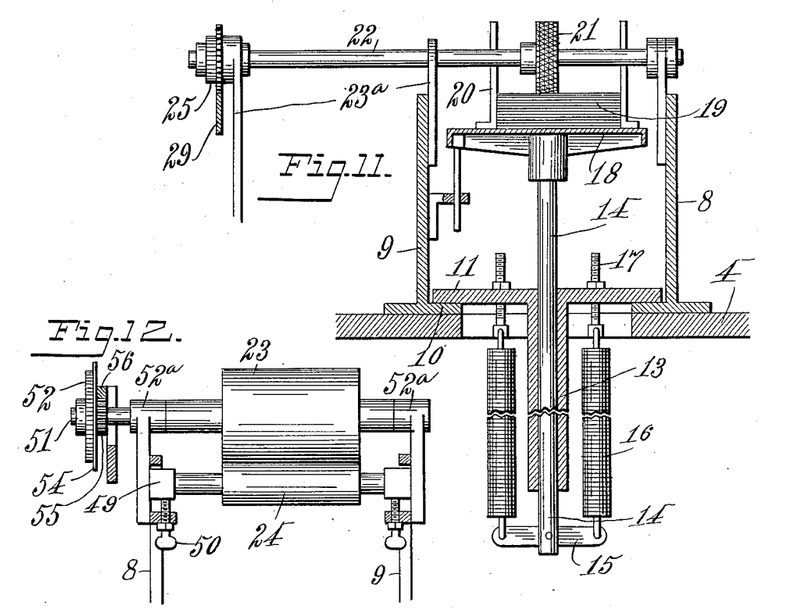
Fig. 11, Sheet 7, is a section on the line $c\ c$ of Fig. 4.
Fig. 12, is a section on the line $d\ d$ of Fig. 4.
Figure 13:
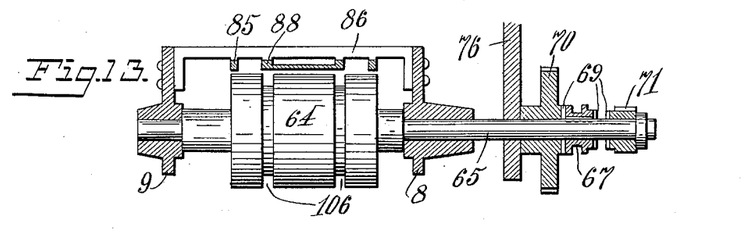
Fig. 13, is a section on the line $e\ e$ of Fig. 4.
Figure 14:
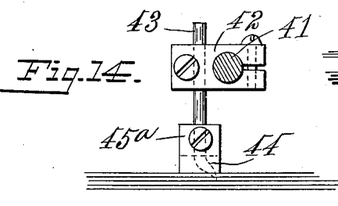
Fig. 14, is a side elevation of the label retaining means on the line of $f\ f$ of Fig. 3.
Figure 15:
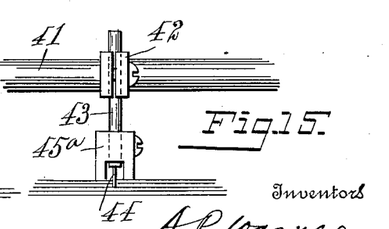
Fig. 15, is a rear elevation of the same.
Figure 16:
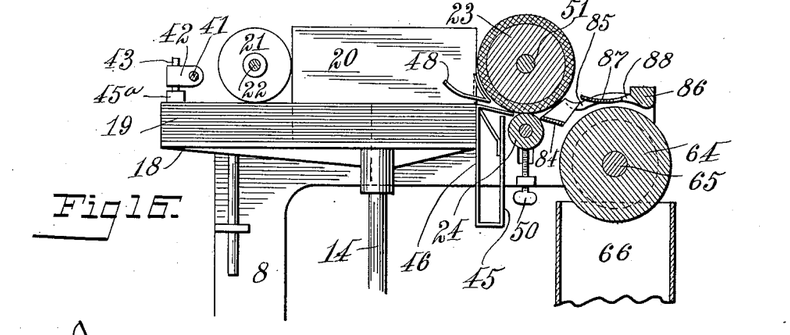
Fig. 16, Sheet 8, is an enlarged sectional elevation of the label feeding means as illustrated at the left in Fig. 4.
Figures 17, 18, 20:
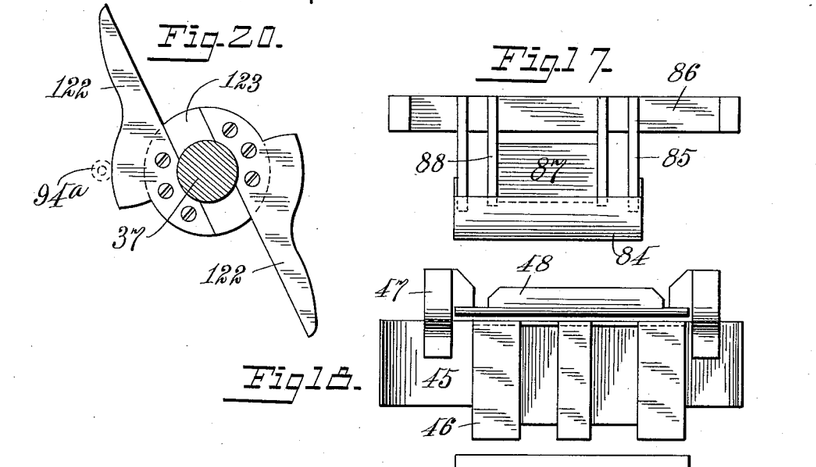
Fig. 17, is a top plan view of the label guide which is mounted between the subsequent feeding rolls and the pasting roll.
Fig. 18, is an elevation of the label guide which is mounted in front of the subsequent feeding rolls.
Fig. 20, is an elevation of the fly back cams for the label gripper.
Figure 19:
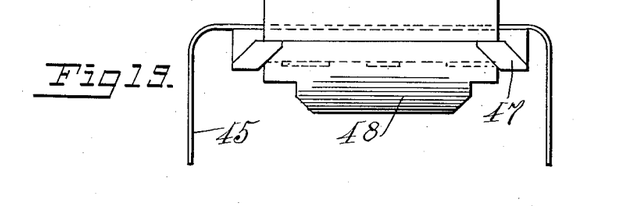
Fig. 19, is a top plan view of the same.
Figure 21:
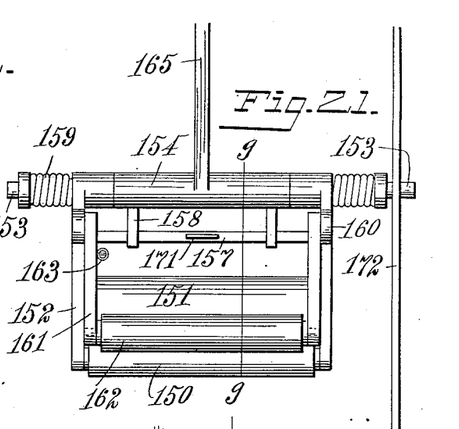
Fig. 21, Sheet 9, is an elevation of the label spreader.

Mounted on a ring 89, supported by the shaft 37 and upon a cross member 90, supported by the side frames 2 and 3, is a guide 91 which provides a bearing for a sliding bar 92. Mounted on the left end of the rod as seen from Fig. 4, is a cross member 92ª upon the lower end of which is mounted a lower plate 93 provided with gripping fingers 94. Pivoted at 94ª to the plate 93 is an upper plate 95 provided with gripping fingers 96 in alinement with the fingers 94. The upper plate 95 is partially controlled by a spring 97 which is adapted, when the upper plate is released, to place the fingers 94 and 96 in contact to engage the label. The upper plate 95 and fingers 96 are held in an opened position by a latch 98 pivoted at 99 and provided with an arm 100. The arm 100 is adapted to be engaged by pins 101 mounted on a revolving spider frame 102 attached to shaft 37. See also Fig. 7. The upper plate 95 and fingers 96 are elevated or raised to an open position by an arm 103 attached to the plate 95 and provided with a roller 104 adapted to engage a cam 105 mounted on the guide 91. The bar 92 which carries the gripping fingers is horizontally and reciprocatingly mounted, and when the bar moves to the extreme right, as seen from Fig. 4, the roller 104, will engage the cam 105 thereby elevating the plate 95. When the plate 95 is elevated, the arm 100 falls by gravity which places the latch 99 under the upper plate 95. The latch therefore holds the plate 95 in an elevated position after the roller 104 disengages the cam 105. When the bar 92 moves to the extreme left, as seen from Fig. 4, the open fingers 94 and 96 enter grooves 106 in the pasting roll 64. At this time, one of the pins 101 engages the arm 100, which trips the latch 98 and permits the fingers 94 and 96 to grip the end of the label. The bar 92 then moves to the right thereby holding the label taut.

The bar 92 is reciprocated as follows: The bar 92 is provided with a rack portion 107 adapted to be engaged by the teeth 108 of a segment gear 109. The gear 109 is mounted on a shaft 110 journaled in bearings 111. The shaft 110, and the gear 109 carried thereby, are rotated from the shaft 37 through a train of gears 112. The ratio of the gearing 112 is such that the gear 109 rotates twice to each revolution of the shaft 37. The bar 92 is moved to the left by the gear 109 and rack, and to the right by a lever 113 pivoted at 114 and controlled by a spring 120. When the gear 109 has moved the bar 92, and the label gripper carried thereby, to the extreme left, the bar 92 is caught by a latch 115 which engages a pin 116 on the bar. The latch 115 is pivoted at 117, is controlled by a spring 118, and is adapted to be actuated to release the bar 92 by a pin 119 carried by the gear 109. When the bar 92 has been released by the teeth 108 of the gear 109, the latch holds the gripper in its position at the left a sufficient length of time for one of the pins 101 to engage the arm 100, thereby permitting the fingers 94 and 96 to grip the end of the label. The movement of the bar 92 to the right under the influence of the spring 120 is arrested by an adjustable stop 121 mounted in an extension 122ª projecting from the guide 91. When the bar 92 is being moved to the right under the influence of the spring 120, the movement of the bar 92 and the gripper carried thereby is controlled by fly back cams 122 shown in detail in Fig. 20. The cams 122 are mounted on a hub 123 secured to the shaft 37. The said cams 122 are adapted to be engaged by one of the pivot bearings 94ª of the upper and lower plates 93 and 95. The said cams 122 prevent the bar 92 flying back too quickly, thereby obviating pounding by the bar. When the gripping fingers 94 and 96 are holding a pasted label taut, a can is brought under the label and is then rotated thereby applying the label to the can by the following mechanism.

*Can carrying mechanism.* (See Figs. 3, 4, 7, and 23 to 31.)—Mounted on the shaft 37 are rotating spider frames 63 and 102 before referred to. The frame 102 is provided with bosses 125 which receive sliding members 126 prevented from being rotated by keys 127. The members 126 are provided with rotating heads 128 having engaging surfaces 129 preferably made of rubber and which engage the can directly. The said members 126 are provided with rollers 130 adapted to be engaged by a cam 131 which forms the beginning of an elevated race 132 mounted on the side frame 2. The cam 131 is adapted to shift the member 126, and the head 128 carried thereby, to engage and clamp the can, while the race 132 maintains the cam in a clamped position during the labeling process. The members are shifted in one direction by the cam and in the other direction by springs 127$^a$. The clamping head 128 engages one end of the can while the other end is engaged by a rotating driving head as follows.

The spider frame 63 is provided with bosses 133 which receive rotating shafts 134. The shafts 134 are provided with heads 135 having rubber engaging surfaces 136 which engage the can. Splined to the shafts 134 are clutch members 137 adapted to be clutched with pinions 138 in mesh with a stationary gear 139 mounted on the side frame 3. The clutch members 137 are partially controlled by springs 141 which are adapted to move the clutch members in engagement with the pinions 138. The clutch members 137 are provided with actuating levers 148 which are pivoted at 142 to projections 143 extending from the bosses 133. The levers 148 are adapted to be engaged by spring controlled latches 144 to hold the clutch members 137 out of engagement with the pinion. The levers 148 are provided with projections 145 adapted to be engaged by a roller 146 mounted on the stationary gear 139 to move the clutch member out of engagement with the pinion 138, while the latches 144 are adapted to be engaged by a cam 147, mounted on the stationary gear 139 to release the levers 148 and to permit the springs 141 to move the clutch member 137 in engagement with the pinion. The cam 147 is mounted on the gear 139 in a position to permit the head to rotate at about the time the can engages the label, while the roller 146 is mounted in a position to release the clutch member at the time the can is discharged from the grippers. It will be noted, that, when the can engages the label one end of the label is held by the grippers while the other end is in engagement with the feeding roll. The can therefore, engages the label squarely which permits the label to be wrapped evenly around the can. It has been found that by thus constructing the device, a label may be evenly wrapped around and pasted to a can having different sized ends or one having a flanged cap.

The cans 149 are fed into the machine over an inclined runway 150$^a$ supported by uprights 151$^a$ extending from the base 1. The said cans 149 are adapted to roll down the runway 150$^a$ under the influence of gravity and are prevented from rolling off by a finger 152$^a$ which extends from a shaft 153$^a$ journaled in the end of the runway. The finger 152$^a$ is controlled by a weight 154$^a$ which returns the finger to an upright position when the lowermost can has been removed from the runway. The finger 152$^a$ is maintained in an elevated position against the influence of the weight 154$^a$ by an arm 155$^a$ adapted to engage a cross member 156$^a$ which extends from the main frame 1. The weight 154$^a$ performs a secondary function, in that, when the lowermost can is being removed by the grippers, and the finger 152$^a$ is depressed the said weight 154$^a$ engages the second can and prevents the remaining cans rolling off the runway. The axis of the lowermost can 149 intersects the circle described by the axes of the clamping heads 128 and 135 which revolve around the shaft 137. When the axes of the heads 128 and 135 come in alinement with the axis of the lowermost can, the roller 130 of the respective head 128 engages the cam 131 thereby moving the head 128 to engage the can 149 and clamping the can between the heads 128 and 135. The continued rotation of the spider frames 63 and 102, which carry the heads 128 and 135, will bring the can under the pasted label held taut by the fingers 94 and 96. At the time the can engages the label, in which position the parts are shown in Fig. 4, the roller 104 engages the cam 105 thereby separating the fingers 94 and 96 and releasing the label. During the continued movement of the can, the free end of the label, which has been held by the gripping fingers 94 and 96, will be spread upon the can by a roller 150 of the label spreading device hereinafter described. At this time, the can begins to revolve, as the cam 147 will engage the respective latch 144 and will permit the respective spring 141 to move the respective clutch member 137 in engagement with the respective pinion 138. During the continued movement of the spider frames 63 and 102, and while the can is revolving, the label is spread upon the can by a label spreading device. It is during this movement that the pasting roll 64 is given an accelerated movement and the clutch member 67 is in engagement with the pinion 71.

*Label spreading mechanism.* (See Figs.

Figure 22:
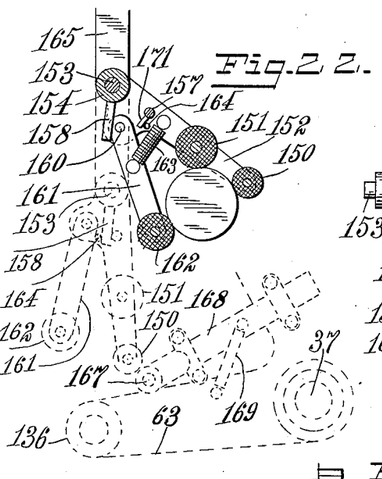
Fig. 22, is a section on the line $g\ g$ of Fig. 21, showing the gripper in operative relation with a can.
Figures 23, 24, 25, 26, 27:
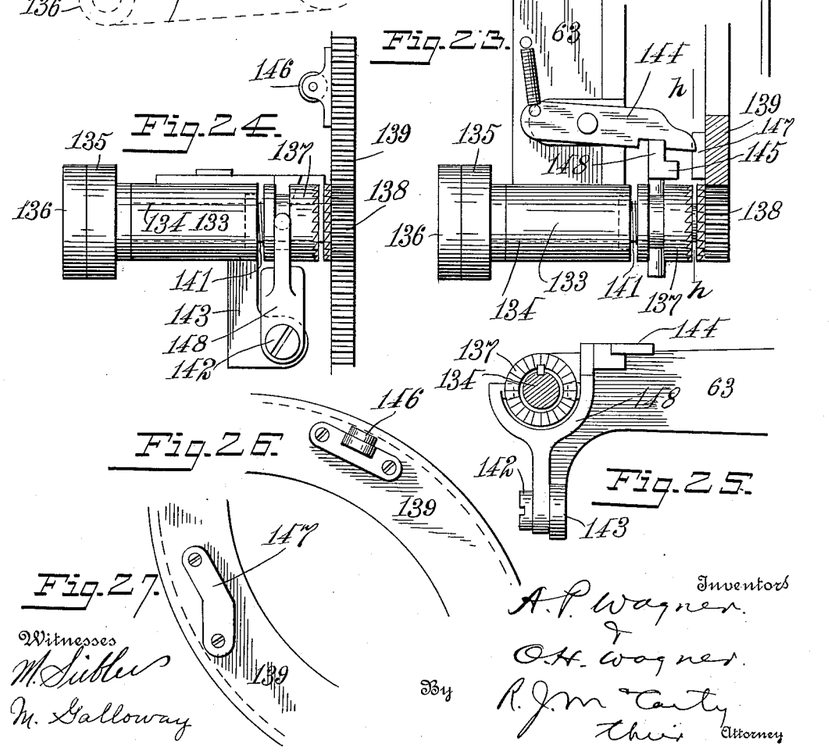
Fig. 23, is a view of one of the members of the can gripper which rotates the can.
Fig. 24, is a view of the same at right angle to that shown in Fig. 23.
Fig. 25, is a section on the line $h\ h$ of Fig. 23.
Fig. 26, is a view of a roller which is instrumental in setting the clutch of the rotating member of the can gripper.
Fig. 27, is a view of a cam which is instrumental in throwing out the same clutch.
Figure 28:
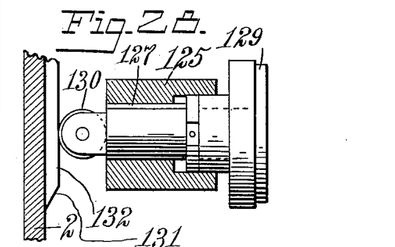
Fig. 28, Sheet 10, is a sectional view on the line $i\ i$ of Fig. 7, showing the clamping member of the can gripper.
Figure 29:
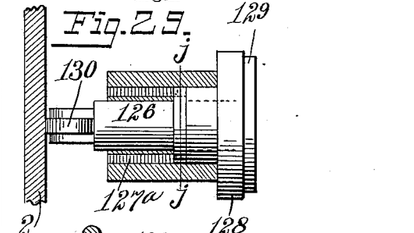
Fig. 29, is a sectional view at right angle to Fig. 28.
Figure 30:
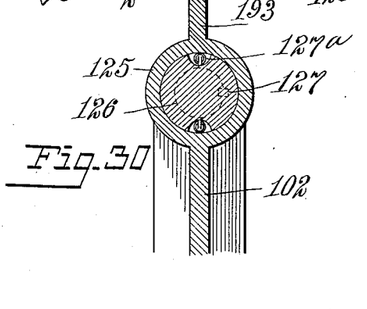
Fig. 30, is a section on the line $j\ j$ of Fig. 29.
Figure 31:
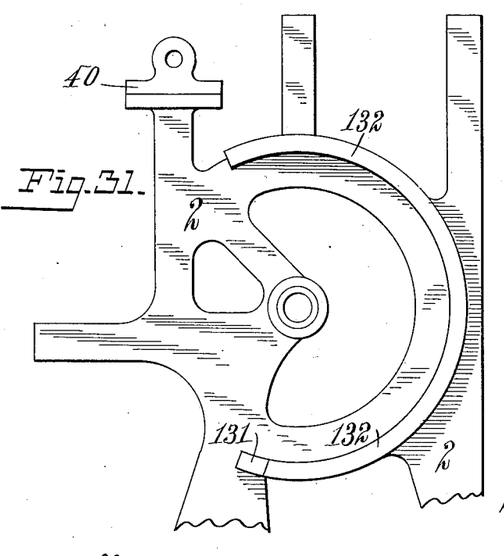
Fig. 31, is an elevation of one of the side members showing the stationary cam which actuates the clamping member of the can gripper.
Figure 32:
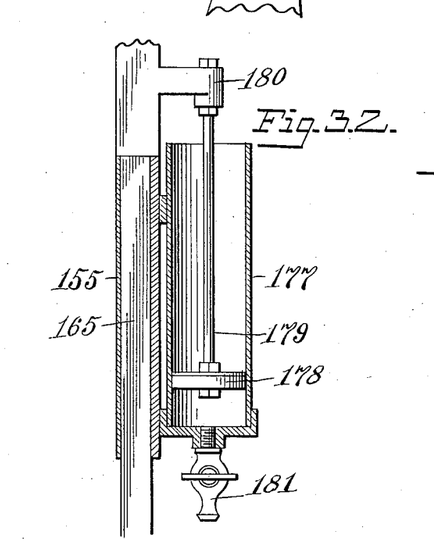
Fig. 32, is a vertical sectional elevation through the dash pot which controls the label spreader.

1, 4, 7, 21, 22 and 32.)—The roller 150, heretofore mentioned, together with a roller 151 is mounted on side arms 152 which are secured to a shaft 153 journaled in a bearing 154. The bearing 154 is mounted on the lower end of a vertically sliding rod 165 journaled in a guide 155 mounted on the cross member 6 supported by the side frames 2 and 3. The normal position of the arms 152 and the rollers carried thereby is that shown in dotted lines in Fig. 22. When in this position a rod 157, which extends between the arms 152 rests against pins 158 which extend from the bearing 154. The frame consisting of the arms 152 and rod 157 is returned to and held in its normal position by springs 159 mounted on the ends of the shaft 153. Pivoted at 160 to the arms 152 are arms 161 which carry a roller 162. The roller 162 is drawn toward the rollers 150 and 151 by a spring 163 but is maintained from contact therewith by any suitable means such as a pin 164. The rollers are maintained apart a distance sufficient to permit the can to enter between the same. During the upward movement of the can, it engages the rollers 150, 151 and 162 which are carried upwardly by said can. The upper end of the rod 165 is provided with a weight 166 which is instrumental in pressing the rollers against the can thereby effectually securing the label to the can. During the continued movement of the can, the rollers are swung around the shaft 153, when the weight becomes less effective. When the rollers are in this position, the rollers 150 and 151 are pressed against the can by pressure rollers 167 carried on sliding members 168 slidingly mounted on the spider frames 63 and 102. The rollers 167 are adapted to engage the arms and roll along the same while pressure is applied by means of springs 169. When the can, during its continued movement finally releases the rollers, the said rollers are returned to a normal position by the springs 159, and the shock of the return movement is arrested by a spring 170 mounted on the guide 155 and adapted to be engaged by a projection 171 mounted on the cross rod 157. When the rollers 150, 151, and 162 are in an elevated position, they are caught by a latch 172 pivoted at 173 to the cross member 6. The latch 172 is adapted to engage one end of the shaft 153 and is partially controlled by a spring 174. At about the time the can engages the label, the lower end 175 of the latch 172 is engaged by one of two projections 176 carried by the spider frame 102 which releases the shaft, 153 and parts carried thereby, thereby permitting the rollers to descend under the influence of the weight 166. The downward movement of the rollers, is however, arrested by a dash pot 177 mounted on the guide 155. The said dash pot is shown in section in Fig. 32 and is provided with a piston 178 mounted on the end of a piston rod 179 secured at 180 to the rod 165. The said dash pot is provided with a relief valve 181 by means of which the escape of air may be regulated.

The can, during its extended travel, engages the left end of a carrying off runway 182 which is mounted upon the brackets 151$^a$. When this engagement takes place, the cam 132 releases the roller 130 and permits the head 128 to release the can. At the same time, the roller 146 engages the lever 148 which disengages the clutch 137 from the pinion thereby eliminating the rotation of the can by the grippers. When the can is deposited in the runway 182 it is caught by a belt 183. The belt 183 passes around a pulley 186, secured to the power shaft 39, and a pulley 195 carried by arms 187 pivoted on the power shaft. The roller 184 is journaled in the runway 182, while the roller 185 is carried by a sliding frame 194 partially controlled by springs 188. When the rollers 184 and 185 are separated by moving the frame 194, the can is discharged from the machine. Attached to the frame 194 is one end of a rod 189 the other end 191 of which is attached to a link 190 pivoted at 196 to a cross member 7 supported by the side frames 2 and 3. The end 191 of the rod 189 is adapted to be engaged by projections 193 which extend from the bosses 125 of the spider frame 102 thereby actuating the frame 194 and permitting the can to be discharged from the machine.

Having described our invention, we claim,

1. In a device of the type specified, a pasting roll, feeding means adapted to feed a label to said pasting roll, can carrying means adapted to place a can in engagement with said label and to subsequently remove said label from engagement with said pasting roll, means for driving said pasting roll at different speeds, said pasting roll being timed with said feeding means during the initial movement of the label and with the can during the subsequent movement of the label.

2. In a device of the type specified, a pasting roll, feeding means adapted to feed a label to said pasting roll, can carrying means adapted to place a can in engagement with said label and to subsequently remove said label from engagement with the pasting roll, a gear and a pinion in operative relation with said pasting roll, means for driving said gear and pinion, and a clutch controlling said operative relation, whereby said pasting roll is timed with the feeding means during the initial movement of the label and with the can during the subsequent movement of the label.

3. In a labeling machine, a pasting roll, label-feeding means adapted to feed labels to said pasting roll, means for holding said label taut when delivered from said pasting roll, a can conveyer adapted to place a can in engagement with each label and to subsequently remove said label from engagement with said pasting roll and said holding means, means for driving said pasting roll at different speeds, said pasting roll being timed with said feeding means during the initial movement of the label and with the can during the subsequent movement of the label.

4. In a labeling machine, a pasting roll, feeding means adapted to feed a label to said pasting roll, means for holding said label taut when delivered from said pasting roll, can-carrying means adapted to place a can in engagement with said label and to subsequently remove said label from engagement with said pasting roll and said holding means, means for spreading said label around said can, means for driving said pasting roll at different speeds, said pasting roll being timed with said feeding means during the initial movement of the label and with the can during the subsequent movement of the label.

In testimony whereof we affix our signatures, in presence of two witnesses.

ALBERT P. WAGNER.
OSWIN H. WAGNER.

Witnesses:
C. G. McCollom,
E. A. Schroeder.

Copies of this patent may be obtained for five cents each, by addressing the "Commissioner of Patents, Washington, D. C."